United States Patent
Fukuda et al.

(10) Patent No.: US 10,606,610 B2
(45) Date of Patent: Mar. 31, 2020

(54) ARITHMETIC OPERATION DEVICE AND CONTROL APPARATUS

(71) Applicant: OMRON Corporation, Kyoto (JP)

(72) Inventors: Yasunori Fukuda, Moriyama (JP); Masaichi Takai, Ritto (JP); Shigeyuki Eguchi, Joyo (JP); Yasuhiro Nishimura, Kyoto (JP)

(73) Assignee: OMRON Corporation, Kyoto (JP)

( * ) Notice: Subject to any disclaimer, the term of this patent is extended or adjusted under 35 U.S.C. 154(b) by 55 days.

(21) Appl. No.: 15/705,280

(22) Filed: Sep. 15, 2017

(65) Prior Publication Data
US 2018/0101393 A1   Apr. 12, 2018

(30) Foreign Application Priority Data

Oct. 7, 2016  (JP) .................................. 2016-199584

(51) Int. Cl.
*G06F 9/44* (2018.01)
*G06F 9/445* (2018.01)
(Continued)

(52) U.S. Cl.
CPC .......... *G06F 9/44505* (2013.01); *G06F 13/36* (2013.01); *G06F 13/385* (2013.01); *G05B 15/02* (2013.01)

(58) Field of Classification Search
CPC ...... G06F 13/36; G06F 9/445; G06F 9/44505; G05B 15/02
See application file for complete search history.

(56) References Cited

U.S. PATENT DOCUMENTS

| 5,596,749 A | * | 1/1997 | Cantrell ................. G06F 13/36 |
| | | | 718/103 |
| 7,024,494 B1 | * | 4/2006 | Pathan ................ G06F 13/4095 |
| | | | 710/10 |

(Continued)

FOREIGN PATENT DOCUMENTS

| CN | 1384410 | 12/2002 |
| CN | 1476702 | 2/2004 |

(Continued)

OTHER PUBLICATIONS

"Search Report of European Counterpart Application," dated Feb. 7, 2018, p. 1-p. 8, in which the listed references were cited.

(Continued)

*Primary Examiner* — Henry Tsai
*Assistant Examiner* — Christopher Daley
(74) *Attorney, Agent, or Firm* — JCIPRNET

(57) ABSTRACT

A new configuration for transmitting and receiving multiple types of data having different characteristics using a common communication line is provided. An arithmetic operation device configuring a control apparatus includes: a communication circuit exchanging data with one or multiple functional units through a communication line; a processor that executes a first process used for issuing a first request for transmitting or receiving data through the communication line in every period set in advance and a second process of issuing a second request for transmitting data through the communication line when a condition set in advance is satisfied; and a control circuit that starts to operate the communication circuit in response to the first request and the second request issued by the processor. The control circuit includes a unit that sets a prohibition period in which the second request is invalidated in association with an execution period of the first process.

10 Claims, 9 Drawing Sheets

(51) Int. Cl.
  *G06F 13/38*   (2006.01)
  *G06F 13/36*   (2006.01)
  *G05B 15/02*   (2006.01)

(56) References Cited

U.S. PATENT DOCUMENTS

| | | |
|---|---|---|
| 7,721,155 B2 | 5/2010 | Holdaway et al. |
| 2002/0015042 A1 | 2/2002 | Robotham et al. |
| 2002/0064157 A1 | 5/2002 | Krause |
| 2002/0161944 A1 | 10/2002 | Okada |
| 2005/0030912 A1* | 2/2005 | Logvinov ............ C07D 223/08 370/295 |
| 2005/0041690 A1 | 2/2005 | Arnold et al. |
| 2009/0097498 A1* | 4/2009 | Ohmi ................ H04L 12/2838 370/461 |
| 2012/0265857 A1 | 10/2012 | Kano |
| 2014/0244876 A1 | 8/2014 | Colpo et al. |
| 2014/0351324 A1 | 11/2014 | Arisawa et al. |
| 2017/0161184 A1* | 6/2017 | Colgrove ............. G06F 12/023 |

FOREIGN PATENT DOCUMENTS

| | | |
|---|---|---|
| CN | 101114234 | 1/2008 |
| CN | 101583154 | 11/2009 |
| CN | 102024166 | 4/2011 |
| DE | 102012204536 | 5/2013 |
| JP | 2014-138206 | 7/2014 |
| WO | 0115384 | 3/2001 |

OTHER PUBLICATIONS

"Office Action of China Counterpart Application," with English translation thereof, dated Nov. 18, 2019, p. 1-p. 23.

\* cited by examiner

ARITHMETIC OPERATION DEVICE AND CONTROL APPARATUS

CROSS-REFERENCE TO RELATED APPLICATION

This application claims the priority benefit of Japan application no. 2016-199584, filed on Oct. 7, 2016. The entirety of each of the above-mentioned patent applications is hereby incorporated by reference herein and made a part of this specification.

BACKGROUND OF THE INVENTION

Field of the Invention

The present invention relates to an arithmetic operation device configuring a control apparatus including one or a plurality of functional units and the control apparatus.

Description of Related Art

As major components used for realizing various kinds of factory automation (FA), control apparatuses such as programmable controllers (programmable logic controllers, PLCs) are widely used. Such the control apparatus exchanges data with one or a plurality of functional units through communication lines. There are cases in which a priority level of such exchanged data is set according to the type or characteristics of the data. For example, in Japanese Unexamined Patent Application Publication No. 2014-138206 (Patent Document 1), a control apparatus capable of more efficiently performing data transmission through a communication line in accordance with a priority level is disclosed.

PRIOR ART DOCUMENT

Patent Documents

[Patent Document 1] Japanese Unexamined Patent Application Publication No. 2014-138206

SUMMARY OF THE INVENTION

In the control apparatus disclosed in Patent Document 1, a priority determining unit determines a priority level of data included in an input frame based on header information included in a header section of the input frame and stores the frame in a queue prepared for each priority level in accordance with a result of the determination.

An object of the present invention is to provide a new configuration used for transmitting/receiving a plurality of types of data having mutually different characteristics through a common communication line.

According to an aspect of the present invention, there is provided an arithmetic operation device configuring a control apparatus including: a communication circuit that is used for exchanging data with one or a plurality of functional units through a communication line; a processor that executes a first process used for issuing a first request for transmitting or receiving data through the communication line in every period set in advance and a second process used for issuing a second request for transmitting data through the communication line when a condition set in advance is satisfied; and a control circuit that starts to operate the communication circuit in response to the first request and the second request issued by the processor. The control circuit includes a unit that sets a prohibition period in which the second request is invalidated in association with an execution period of the first process.

Preferably, when the second request is received within the prohibition period, the control circuit postpones start of an operation of the communication circuit in response to the received second request until after an end of the prohibition period.

Preferably, the control circuit starts the prohibition period a time set in advance before an execution timing of the first process.

Preferably, the control circuit acquires an execution timing of the first process from a scheduler managing execution of the first process and the second process in the processor and sets the prohibition period.

Preferably, the first request includes at least one of a request for transmitting data to the one or plurality of functional units and a request for acquiring data stored by the one or plurality of functional units.

Preferably, the first request includes a request for transmitting a message to a specific functional unit among the one or plurality of functional units.

Preferably, the control circuit is mounted using an FPGA (Field Programmable Gate Array) or an ASIC (Application Specific Integrated Circuit).

According to another aspect of the present invention, there is provided a control apparatus including an arithmetic operation device and one or a plurality of functional units. The arithmetic operation device includes: a communication circuit that is used for exchanging data with the one or plurality of functional units through a communication line; a processor that executes a first process used for issuing a first request for transmitting or receiving data through the communication line in every period set in advance and a second process used for issuing a second request for transmitting data through the communication line when a condition set in advance is satisfied; and a control circuit that starts to operate the communication circuit in response to the first request and the second request issued by the processor. The control circuit includes a unit that sets a prohibition period in which the second request is invalidated in association with an execution period of the first process.

According to the present invention, a new configuration for transmitting/receiving a plurality of types of data having mutually different characteristics through a common communication line can be provided.

DESCRIPTION OF THE EMBODIMENTS

Figure 1:
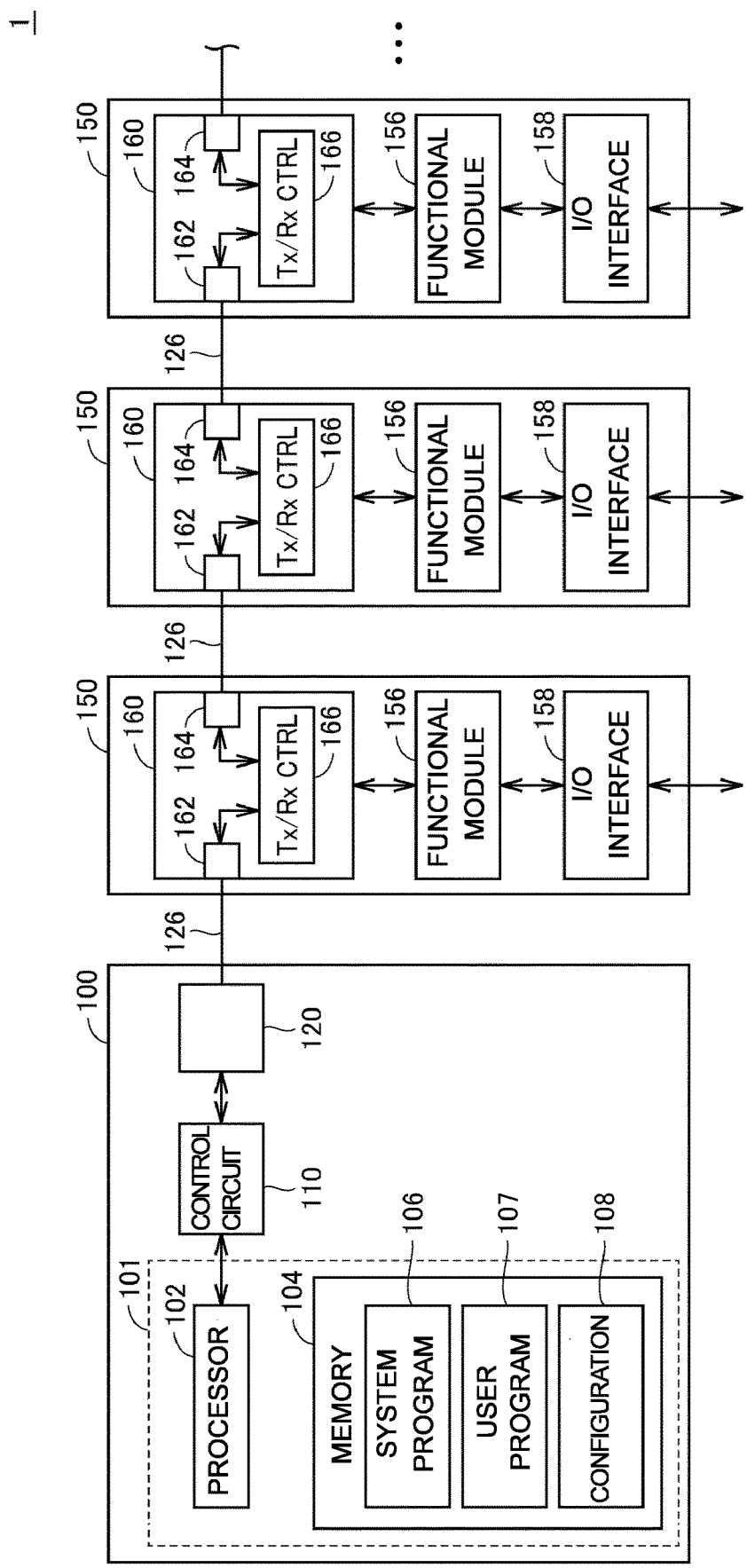
FIG. 1 is a schematic diagram illustrating the configuration of a main part of a PLC according to this embodiment.

An embodiment of the present invention will be described in detail with reference to the drawings. In the drawings, the same reference numeral is assigned to the same portion or corresponding portions, and the description thereof will not be repeated.

While a programmable controller (programmable logic controllers, PLC) will be described as a specific example as a typical example of a "control apparatus" in the following description, the technical idea disclosed here can be applied to an arbitrary control apparatus and is not limited to the name "PLC."

A. Apparatus Configuration

First, the apparatus configuration of a PLC according to this embodiment will be described. FIG. 1 is a schematic diagram illustrating the configuration of a main part of the PLC according to this embodiment.

As illustrated in FIG. 1, the PLC 1 according to this embodiment is typically configured by a CPU (Central Processing Unit) unit 100 and one or a plurality of functional units 150. The CPU unit 100 is one element configuring the PLC 1 and corresponds to an arithmetic operation device controlling the overall process of the PLC 1. The functional units 150 provide various functions for realizing control of various machines and facilities using the PLC 1. The CPU unit 100 and one or a plurality of the functional units 150 are connected through a local network 126 that is an example of a communication line.

The CPU unit 100 includes an arithmetic operation processing unit 101, a control circuit 110, and a communication circuit 120.

The arithmetic operation processing unit 101 includes a processor 102 and a memory 104. While only one processor 102 is illustrated in FIG. 1 for convenience of description, a plurality of processors may be mounted. In addition, each processor may include a plurality of cores.

The memory 104 includes a portion (typically, a volatile memory) providing a work area that is necessary for the execution of a program in the processor 102 and a portion (typically, a nonvolatile memory) storing a program executed by the processor 102. As the volatile memory, a dynamic random access memory (DRAM), a static random access memory (SRAM), or the like may be used. As the nonvolatile memory, a flash memory, a hard disk, or the like may be used.

In the memory 104, a system program 106, a user program 107, a configuration 108, and the like are stored. The system program 106 includes an operating system (OS) used for the processor 102 to execute the user program 107, a program library, and the like. Typically, the user program 107 includes instructions for performing a process of acquiring data (hereinafter, also referred to as "input data") collected by one or a plurality of the functional units 150 and a process of generating data (hereinafter, also referred to as "output data") transmitted to one or a plurality of the functional units 150, and the user program 107 is arbitrarily generated according to the machines or the facilities that are targets of the control process. The configuration 108 includes various set values that are necessary for the execution of a program in the CPU unit 100 and various set values defining a network configuration.

The control circuit 110 has a function of relating a request between the arithmetic operation processing unit 101 and the communication circuit 120. For example, the control circuit 110 gives an instruction to the communication circuit 120 in response to a communication request from the processor 102, thereby performing transmission or reception of data. The process and the function of the control circuit 110 will be described later in detail.

At least a main part of the control circuit 110 has a hard-wired configuration and thus realizes a process at a speed higher than that of the processor 102. In other words, the control circuit 110 is realized using hardware logics. For example, the control circuit 110 may be mounted using a field-programmable gate array (FPGA) that is an example of a programmable logic device (PLD), an application specific integrated circuit (ASIC) that is an example of an integrated circuit (IC), or the like.

The communication circuit 120 exchanges data with one or a plurality of the functional units 150 through the local network 126 that is a communication line. More specifically, the communication circuit 120 receives data (input data) collected or generated by one or a plurality of the functional units 150 and transmits data (output data) acquired or generated by the CPU unit 100 to one or a plurality of functional units 150. The output data corresponds to an instruction value given from each functional unit 150 to a machine, a facility, or the like that is a control target. In addition, the communication circuit 120 can transmit or receive a message generated in an event through the local network 126.

More specifically, the communication circuit 120 is physically connected to the local network 126, generates an electric signal in accordance with an instruction from the control circuit 110, and transmits the generated electric signal to the local network 126, and outputs an electric signal generated on the local network 126 to the arithmetic operation processing unit 101 through the control circuit 110. The communication circuit 120, in addition to the exchange of data through the local network 126, has functions of time management for guaranteeing the arrival time of data transmitted though the local network 126, management of transmission/reception timings, and the like.

In the PLC 1 according to this embodiment, on the local network 126, communication frames having a data structure set in advance may be sequentially transmitted in a predetermined period, and the CPU unit 100 and each functional unit 150, for the sequentially transmitted communication frames, record designated data in each designated area and read necessary data from corresponding areas.

In this way, as the local network 126, one kind of fixed-period network may be employed, and under the control of the communication circuit 120 of the CPU unit 100, each of one or a plurality of the functional units 150 repeats transmission of input data to the CPU unit 100 and reception of output data from the CPU unit 100 for every predetermined period.

As such a fixed-period network, a network relating to one of known protocols such as EtherCAT (registered trademark), EtherNet/IP (registered trademark), DeviceNet (registered trademark), or CompoNet (registered trademark) may be employed.

In the configuration illustrated in FIG. 1, while the arithmetic operation processing unit 101, the control circuit 110, and the communication circuit 120 are drawn as if they were separately configured as three parts for convenience of description, the configuration is not limited thereto, but an arbitrary mounting form may be employed. For example, all or a part of the arithmetic operation processing unit 101 and the control circuit 110 may be mounted on a same chip to be configured as a system-on-chip (SoC). Alternatively, the control circuit 110 and the communication circuit 120 may be mounted on individual single chips while the entire arithmetic operation processing unit 101 is mounted on another single chip. Such a mounting form is selected appropriately in consideration of required performance, costs, and the like.

The functional unit 150 typically includes an I/O unit, a communication unit, a temperature adjusting unit, an identifier (ID) sensor unit, and the like.

Examples of the I/O unit includes a digital input (DI) unit, a digital output (DO) unit, an analog input (AI) unit, an analog output (AO) unit, a pulse catch input unit, and a multiple unit mixing a plurality of types of units.

The communication unit relays exchange of data with another PLC, a remote I/O device, functional units, and the like and, for example, may include a communication device or the like relating to any one of protocols such as EtherCAT (registered trademark), EtherNet/IP (registered trademark), DeviceNet (registered trademark), CompoNet (registered trademark), and the like.

The temperature adjusting unit is a control device including an analog input function of acquiring a temperature measurement value and the like, an analog output function of outputting a control instruction and the like, and a proportional integral differential (PID) control function. The ID sensor unit is a device that reads data from a radio frequency identifier (RFID) or the like in a non-contacting manner.

More specifically, each of the functional units 150 includes a functional module 156, an I/O interface 158, and a communication circuit 160.

The functional module 156 is a part that performs a main process of each functional unit 150 and is responsible for collecting field information from a machine, a facility, or the like that is a control target, outputting an instruction signal to a machine, a facility, or the like that is a control target, and the like.

The I/O interface 158 is a circuit that relays exchange of signals with a machine, a facility, or the like that is a control target.

The communication circuit 160 processes communication frames that are sequentially transmitted through the local network 126. In other words, when a certain communication frame is received through the local network 126, the communication circuit 160 performs data writing and/or data reading for the received communication frame and then transmits the communication frame to a functional unit 150 positioned next on the local network 126. The communication circuit 160 provides such a frame relay function.

More specifically, the communication circuit 160 includes a transmission/reception controller 166 and transmission/reception ports 162 and 164.

Each of the transmission/reception ports 162 and 164 is a part that is physically connected to the local network 126, generates an electric signal in accordance with an instruction from the transmission/reception controller 166 and transmits the generated electric signal onto the local network 126, and converts an electric signal generated on the local network 126 into a digital signal and outputs the converted digital signal to the transmission/reception controller 166.

The transmission/reception controller 166 performs data writing and/or data reading for a communication frame transmitted on the local network 126.

B. Communication Frames

Next, several communication frames transmitted on the local network 126 will be described.

Figure 2A:
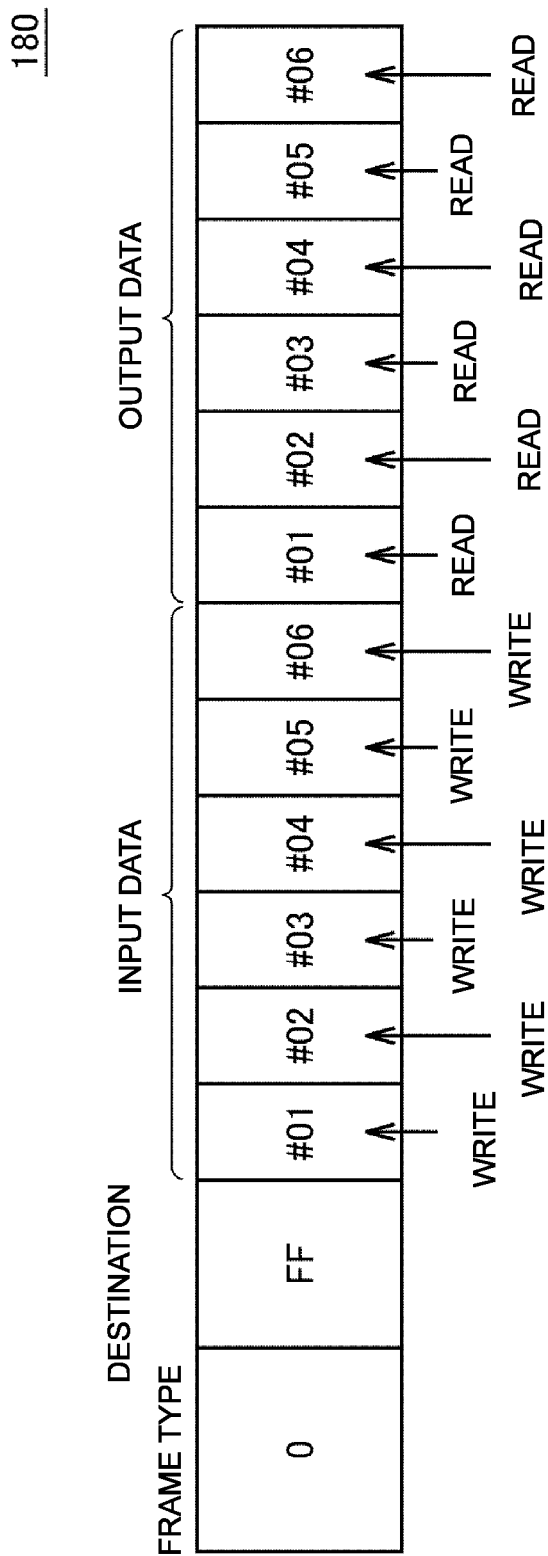
FIGS. 2A and 2B are schematic diagrams illustrating examples of the data structure of a communication frame of a PLC according to this embodiment transmitted through a local network.
Figure 2B:
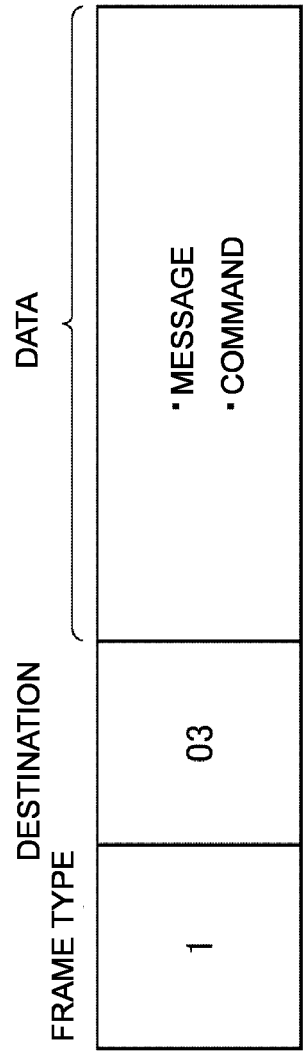

FIGS. 2A and 2B are schematic diagrams illustrating examples of the data structure of communication frames transmitted on the local network 126 of the PLC 1 according to this embodiment. FIG. 2A illustrates an example of the data structure of an I/O refresh frame 180, and FIG. 2B illustrates an example of the data structure of an event frame 190.

The I/O refresh frame 180 illustrated in FIG. 2A acquires input data from one or a plurality of the functional units 150 and gives output data to one or a plurality of the functional units 150. In other words, the I/O refresh frame 180 is used for refreshing input data maintained by the CPU unit 100 and refreshing output data maintained by each functional unit 150.

More specifically, the I/O refresh frame 180 is formed by a header section in which a frame type and a destination are stored and a main body section in which data is stored.

As the frame type, identification information used for specifying the type of communication frame is used, and for example, identification information representing one of unicast, multicast, and broadcast is used. The I/O refresh frame 180 is transmitted from the CPU unit 100 and is returned to the CPU unit 100 after one cycle around the local network 126, and accordingly, typically stores identification information representing the multicast. At this time, in the transmission of the multicast, since there is no specific destination, a specific value is stored.

In the main body section, an area of input data and an area of output data are defined, and each of the areas is associated with all or a part of each functional unit 150 connected to the local network 126. When an I/O refresh frame 180 is received, each functional unit 150 reads output data stored in an area assigned to it and writes input data that it has collected or generated in the area assigned to it. As the reading of the output data and the writing of the input data are performed in each functional unit 150, the acquisition of input data and the transmission of output data from each functional unit 150 connected to the local network 126 can be realized.

In FIG. 2A, while an example of the data structure in which input data from one or a plurality of the functional units 150 and output data toward one or a plurality of the functional units 150 are stored in a single communication frame is illustrated, however, a communication frame in which only one of the input data and the output data is stored may be employed. In such a case, for example, a communication frame used for input data and a communication frame used for output data may be individually prepared. In addition, there are cases in which input data and output data that are targets for I/O refresh are configured in advance, and all the data collected by the functional units 150 is not transmitted to the CPU unit 100.

In this way, a request (first request) for transmitting an I/O refresh frame 180 includes at least one of a request for transmitting output data to one or a plurality of the functional units 150 and a request for acquiring input data stored by one or a plurality of the functional units 150.

The event frame 190 illustrated in FIG. 2B, similar to the I/O refresh frame 180, is formed by a header section in which a frame type and a destination are stored and a main body section in which data is stored.

The event frame 190, for example, may include a command directing to change a status or a set value for each functional unit 150, a command used for transmitting a log, a state value, and the like stored in each functional unit 150 to the CPU unit 100, and the like.

As the frame type, typically, identification information representing unicast or broadcast is used. When unicast is designated, identification information representing a specific destination is stored. On the other hand, when broadcast is designated, there is no specific destination, and a specific value is stored. In the main body section, a message to be transmitted or notified of, a command representing a process to be executed, or the like is stored. Content stored in the main body section of the event frame 190 may be arbitrarily set.

In this way, the request (second request) for transmitting the event frame 190 may include a request for transmitting a message to a specific functional unit 150 among one or a plurality of the functional units 150.

C. Process of Transmitting Communication Frames

Figure 3:
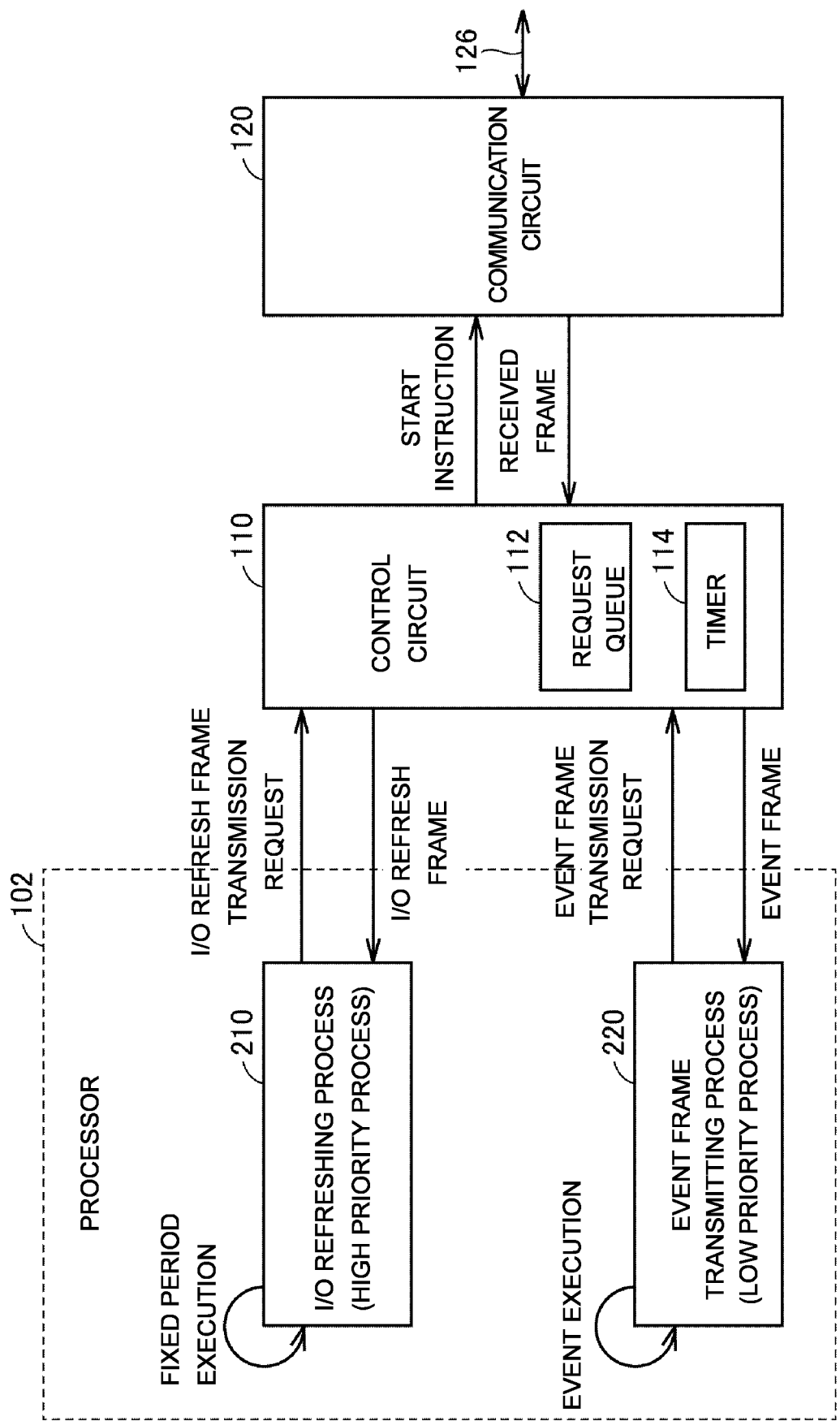
FIG. 3 is a schematic diagram illustrating the configuration of a device for realizing processes of transmitting communication frames in a PLC according to this embodiment.

Next, a configuration relating to the transmission of the communication frames as illustrated in FIGS. 2A and 2B will be described. FIG. 3 is a schematic diagram illustrating the configuration of a device for realizing processes of transmitting communication frames in the PLC 1 according to this embodiment.

The processes relating to the transmission and reception of the I/O refresh frame 180 illustrated in FIG. 2A and the event frame 190 illustrated in FIG. 2B are executed in the processor 102. As illustrated in FIG. 3, an I/O refreshing process 210 used for executing the acquisition of input data and the transmission of output data by using the I/O refresh frame 180 (FIG. 2A) and an event frame transmitting process 220 used for executing a process of transmitting a certain event frame to one or a plurality of the functional units 150 by using the event frame 190 (FIG. 2B) are executed in the processor 102. The I/O refreshing process 210 and the event frame transmitting process 220 are realized by executing a program included in the system program 106 or the user program 107 by using the processor 102.

A plurality of programs (also referred to as "tasks") are executed in the processor 102. In order to manage the execution time of each program, the processor time of the processor 102 is assigned according to a priority level of each program. In the example illustrated in FIG. 3, the I/O refreshing process 210 is a task that is repeatedly executed (fixed-period execution) in a fixed period set in advance, and the event frame transmitting process 220 is a task executed in an empty processor time of the processor 102. Considering such characteristics, a priority level that is higher than that of the event frame transmitting process 220 is set to the I/O refreshing process 210. For convenience of description, a process to which a relatively high priority level is set such as the I/O refreshing process 210 will be referred to as a "high priority process," and a process to which a relatively low priority level is assigned such as the event frame transmitting process 220 will be referred to as a "low priority process."

The I/O refreshing process 210 that is a high priority process is typically executed according to an interrupt instruction generated for every fixed period set in advance.

In the CPU unit 100 according to this embodiment, the control circuit 110 controls the exchange of data through the local network 126 using the communication circuit 120. More specifically, the control circuit 110 starts to operate the communication circuit 120 in response to a frame transmission request from the processor 102 and transmits a frame directed from the communication circuit 120. In addition, the control circuit 110 outputs a returning frame (in other words, the I/O refresh frame 180 after one cycle around the local network 126) received by the communication circuit 120 or a reception response (for example, a communication frame such as an acknowledgement (ACK)) from a transmission destination to the processor 102.

The control circuit 110 includes a request queue 112 used for buffering a frame transmission request or the like and a timer 114 used for measuring time.

When a plurality of frame transmission requests are given from the processor 102, a request queue 112 stores these frame transmission requests.

As the timer 114, while a real time clock may be employed, in this embodiment, a free run counter that counts up (increments) at a predetermined period is used. By regarding a counter value output by the free run counter as an elapsed time from a certain time point, the current time can be calculated, and accordingly, the free run counter can function as a timer. The timer 114 is used for setting a prohibition period to be described later, and the like.

In the example illustrated in FIG. 3, by periodically executing the I/O refreshing process 210, the processor 102 periodically transmits an I/O refresh frame transmission request to the control circuit 110 and acquires the I/O refresh frame 180 after one cycle, which is output from the control circuit 110, received from the communication circuit 120. In other words, the processor 102 executes the I/O refreshing process 210 (first process) for issuing an I/O refresh frame transmission request (first request) used for transmitting or receiving data through the local network 126 that is a communication line for every period set in advance.

In addition, by executing the event frame transmitting process 220 as an event, the processor 102 transmits an event frame transmission request to the control circuit 110 as an event and acquires a reception response (ACK), which is output from the control circuit 110, received by the communication circuit 120. The event frame transmitting process 220 is a process that is executed as an event when a condition set in advance is satisfied. For example, the event frame transmitting process 220 is executed in when a certain internal flag is set to On or the like. In this way, the processor 102 executes the event frame transmitting process 220 (second process) in which an event frame transmission request (second request) for transmitting data through the local network 126 that is a communication line is issued when a condition set in advance is satisfied.

The control circuit 110 starts to operate the communication circuit 120 in response to the I/O refresh frame transmission request (first request) and the event frame transmission request (second request) issued by the processor 102.

By employing the control circuit 110 relaying the processor 102 and the communication circuit 120 as illustrated in FIG. 3, when viewed from each process executed in the processor 102, when a communication frame transmission request is merely output to the control circuit 110, a subsequent communication process does not need to be managed, and accordingly, there is an advantage that the process can be simplified.

D. Related Technology

Next, a related technology relating to the control circuit 110 that relays the processor 102 and the communication circuit 120 will be described.

Figure 4:
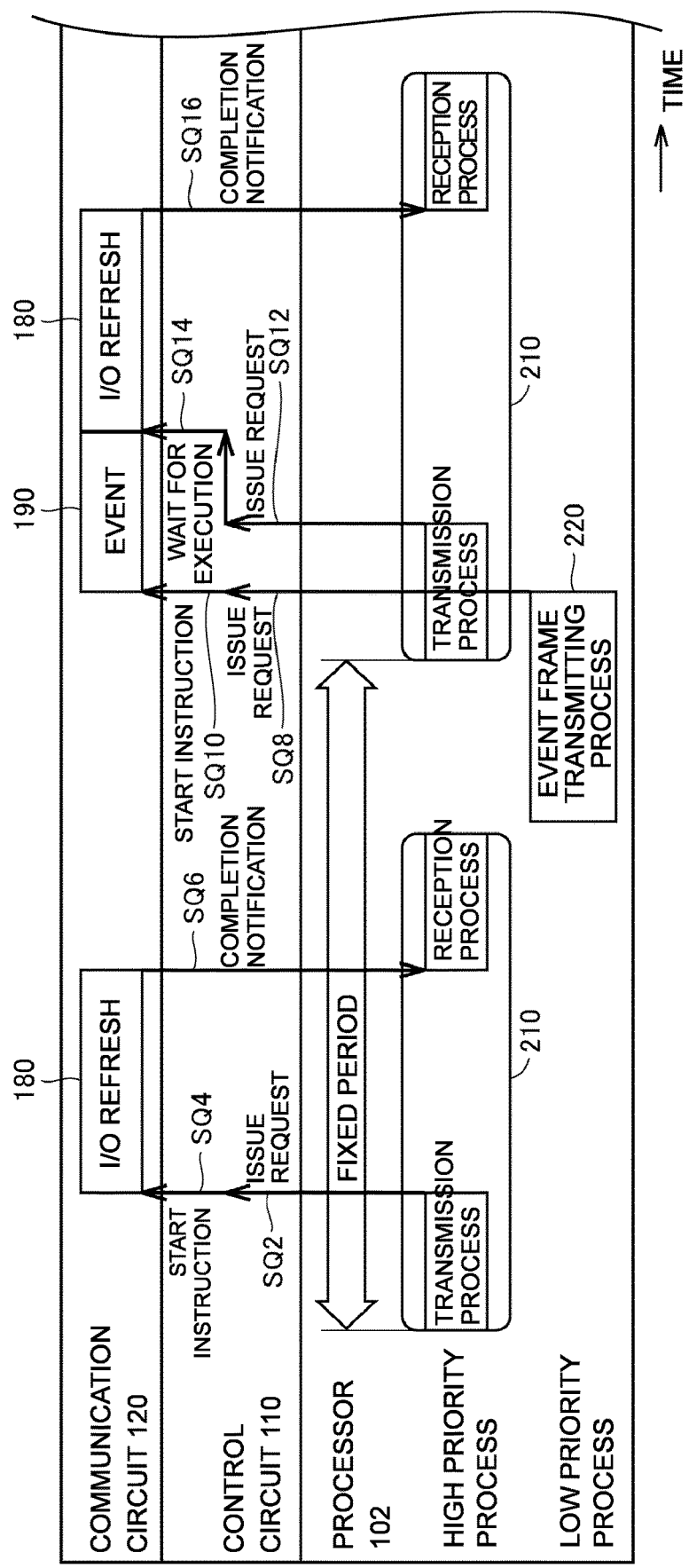
FIG. 4 is a timing diagram describing a related technology relating to the transmission of communication frames in a PLC according to this embodiment.

FIG. 4 is a timing diagram describing a related technology relating to the transmission of a communication frame in the PLC 1 according to this embodiment. As illustrated in FIG. 4, in the processor 102, it is assumed that an I/O refreshing process 210 is repeatedly executed at a fixed period as a high priority process, and an event frame transmitting process 220 is sequentially executed as a low priority process. By setting priority levels differently, while the transmission of the I/O refresh frame 180 at every fixed period by the I/O refreshing process 210 is maintained, the transmission of an event frame 190 is realized as necessary without influence on the transmission for every fixed period.

The I/O refreshing process 210 typically includes a transmission process in which collection, processing, and the like of data that are necessary for generating an I/O refresh frame 180 are executed and a reception process in which extraction, processing, and the like of data included in the received I/O refresh frame 180 are executed. In the I/O refreshing process 210, when the transmission process is completed, the processor 102 issues a request for transmitting an I/O refresh frame 180 to the control circuit 110 (Sequence SQ2). The control circuit 110 gives a start instruction to the communication circuit 120 in response to this transmission request, thereby transmitting an I/O refresh frame 180 from the communication circuit 120 (Sequence SQ4). Thereafter, when the I/O refresh frame 180 after one cycle around the local network 126 is received, the communication circuit 120 outputs a completion notification to the processor 102 through the control circuit 110 (Sequence SQ6). In response to the completion notification, the processor 102 executes the reception process of the I/O refreshing process 210. According to the completion of the execution of the reception process, the execution of the I/O refreshing process 210 ends. Such an I/O refreshing process 210 is repeated for every fixed period. In addition, in consideration of a time required for the I/O refreshing process 210, the length of the fixed period in which the I/O refreshing process 210 is repeatedly executed is determined.

In the example illustrated in FIG. 4, a case in which, after the execution of the previous I/O refreshing process 210, the event frame transmitting process 220 is executed before start of the execution of a following I/O refreshing process 210 is illustrated. FIG. 4 illustrates an example of the process of a case in which the processor 102 formed by multiple cores or multiple processors capable of parallel execution of a high priority process and a low priority process is employed.

In the event frame transmitting process 220, when the process of executing collection, processing, and the like of data included in the event frame 190 is executed, and when the process is completed, the processor 102 issues a request for transmitting an event frame 190 to the control circuit 110 (Sequence SQ8). The control circuit 110 gives a start instruction to the communication circuit 120 in response to this transmission request, thereby transmitting the event frame 190 from the communication circuit 120 (Sequence SQ10).

At this time, as illustrated in FIG. 4, when the completion timing of the event frame transmitting process 220 is delayed to be after the start of the execution of the following I/O refreshing process 210, the transmission timing of the I/O refresh frame 180 deviates. In other words, when the transmission process is completed in the following I/O refreshing process 210, the processor 102 issues a request for transmitting the I/O refresh frame 180 to the control circuit 110 (Sequence SQ12). At this time, the communication circuit 120 is in the process of transmitting the event frame 190, and thus the control circuit 110 cannot immediately give a start instruction to the communication circuit 120. For this reason, the control circuit 110 gives a start instruction to the communication circuit 120 after waiting for the completion of the process of transmitting the event frame 190 in the communication circuit 120, thereby transmitting an I/O refresh frame 180 from the communication circuit 120 (Sequence SQ14). Thereafter, when the I/O refresh frame 180 after one cycle around the local network 126 is received, the communication circuit 120 outputs a completion notification to the processor 102 through the control circuit 110 (Sequence SQ16).

In this way, in the processor 102, while the I/O refresh frame 180 is transmitted in a fixed period (in other words, time fluctuation does not occur in the communication period) by setting different priority levels, even in a low priority process, by executing the event frame transmitting process 220 in parallel, there is a possibility that the transmission timing of the I/O refresh frame 180 is influenced.

Particularly, in the execution of a program in the processor 102, there is time fluctuation, and accordingly, it is not easy to accurately manage the execution timing and the like of the event frame transmitting process 220.

Thus, in the PLC 1 according to this embodiment, by mounting a function presented below in the control circuit 110, it is guaranteed that the I/O refresh frame 180 is transmitted in a fixed period.

E. Employment of Prohibition Period

In the PLC 1 according to this embodiment, in correspondence with the transmission period of the I/O refresh frame 180 (in other words, the execution period of the I/O refreshing process 210), a prohibition period in which an event frame transmission request (second request) is invalidated is set. Such a prohibition period is set by the control circuit 110 that is independent from the processor 102. Accordingly, the transmission period of the I/O refresh frame 180 can be guaranteed without being influenced by a time fluctuation occurring in the execution of a program in the processor 102.

Figure 5:
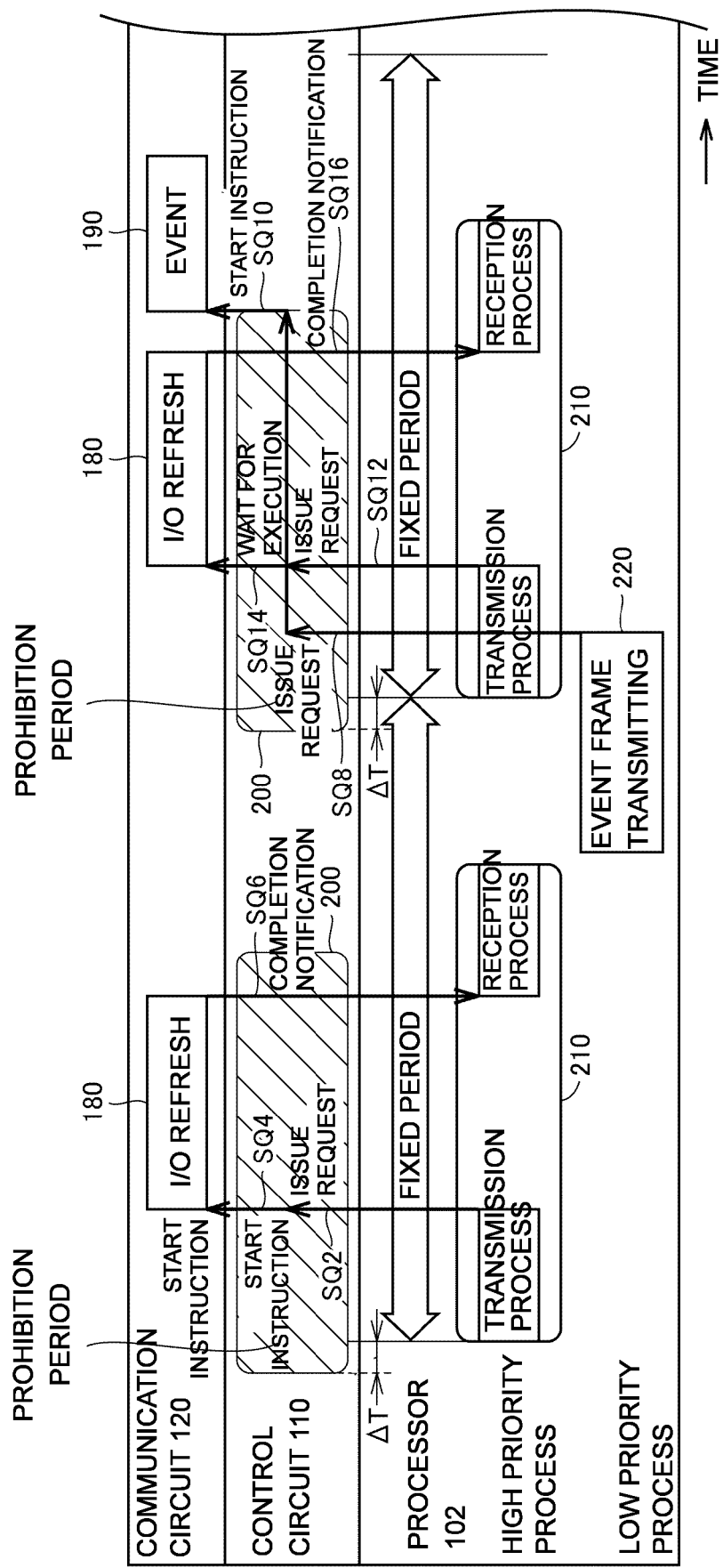
FIG. 5 is a timing diagram illustrating a process relating to the transmission of communication frames in a PLC according to this embodiment.

FIG. 5 is a timing diagram illustrating a process relating to the transmission of a communication frame in the PLC 1 according to this embodiment. FIG. 5, similar to FIG. 4, illustrates a state in which the I/O refreshing process 210 and the event frame transmitting process 220 are executed by the processor 102.

In this embodiment, the control circuit 110 sets a period (prohibition period 200) in which transmission of a communication frame other than the I/O refresh frame 180 is prohibited in correspondence with the transmission period of the I/O refresh frame 180 (in other words, the execution period of the I/O refreshing process 210). By setting this prohibition period 200, a request for transmitting a communication frame other than the I/O refresh frame 180 (including a request for transmitting an event frame) is invalidated.

However, depending on the situation, in the prohibition period 200, a request for transmitting an event frame may be invalidated, and a request for transmitting a communication frame having a high priority level other than the I/O refresh frame 180 may be validated.

In the prohibition period 200, even when the processor 102 issues a request for transmitting an event frame 190 to the control circuit 110 after the completion of the event frame transmitting process 220 (Sequence SQ8), the control circuit 110 does not give a start instruction to the communication circuit 120. Then, when the prohibition period 200 ends, the control circuit 110 gives a start instruction to the communication circuit 120 in response to the request for transmitting an event frame 190 that has been received previously, thereby transmitting the event frame 190 from the communication circuit 120 (Sequence SQ10).

In other words, when an event frame transmission request (second request) is received within the prohibition period 200, the control circuit 110 postpones the start of the operation of the communication circuit 120 in response to the received event frame transmission request until after the end of the prohibition period 200. According to such a postponing process, the process of transmitting the I/O refresh frame 180 is not delayed.

Meanwhile, when the transmission process is completed in the following I/O refreshing process 210, the processor 102 issues a request for transmitting an I/O refresh frame 180 to the control circuit 110 (Sequence SQ12). Since it has no influence on the request for transmitting an I/O refresh frame 180 whether or not the prohibition period 200 is set, the control circuit 110 gives a start instruction to the communication circuit 120 in response to the transmission request, thereby transmitting an I/O refresh frame 180 from the communication circuit 120 (Sequence SQ14). Thereafter, when the I/O refresh frame 180 after one cycle around the local network 126 is received, the communication circuit 120 outputs a completion notification to the processor 102 through the control circuit 110 (Sequence SQ16). In response to the completion notification, the processor 102 executes the reception process of the I/O refreshing process 210.

In this way, a fixed period including before and after the transmission process of the I/O refresh frame 180 is set as the prohibition period 200, and a transmission request (in this example, a request for transmitting an event frame 190) other than a request for transmitting an I/O refresh frame 180 is substantially invalidated, whereby the I/O refresh frame 180 can be repeatedly transmitted in a fixed period. In addition, when a request for transmitting an event frame 190 is issued during the prohibition period 200, immediately after the end of the prohibition period 200, a start instruction for transmitting an event frame 190 is given to the communication circuit 120.

The prohibition period 200 is set from a timing (before a time ΔT) before a timing at which the execution of the I/O refreshing process 210 is started. In other words, the control circuit 110 starts the prohibition period 200 a time ΔT set in advance before the timing of the execution of the I/O refreshing process 210 (first process). The length of the time ΔT is determined in consideration of the length of time required for processing the event frame 190 issued by the event frame transmitting process 220 that is executed first.

Figure 6:
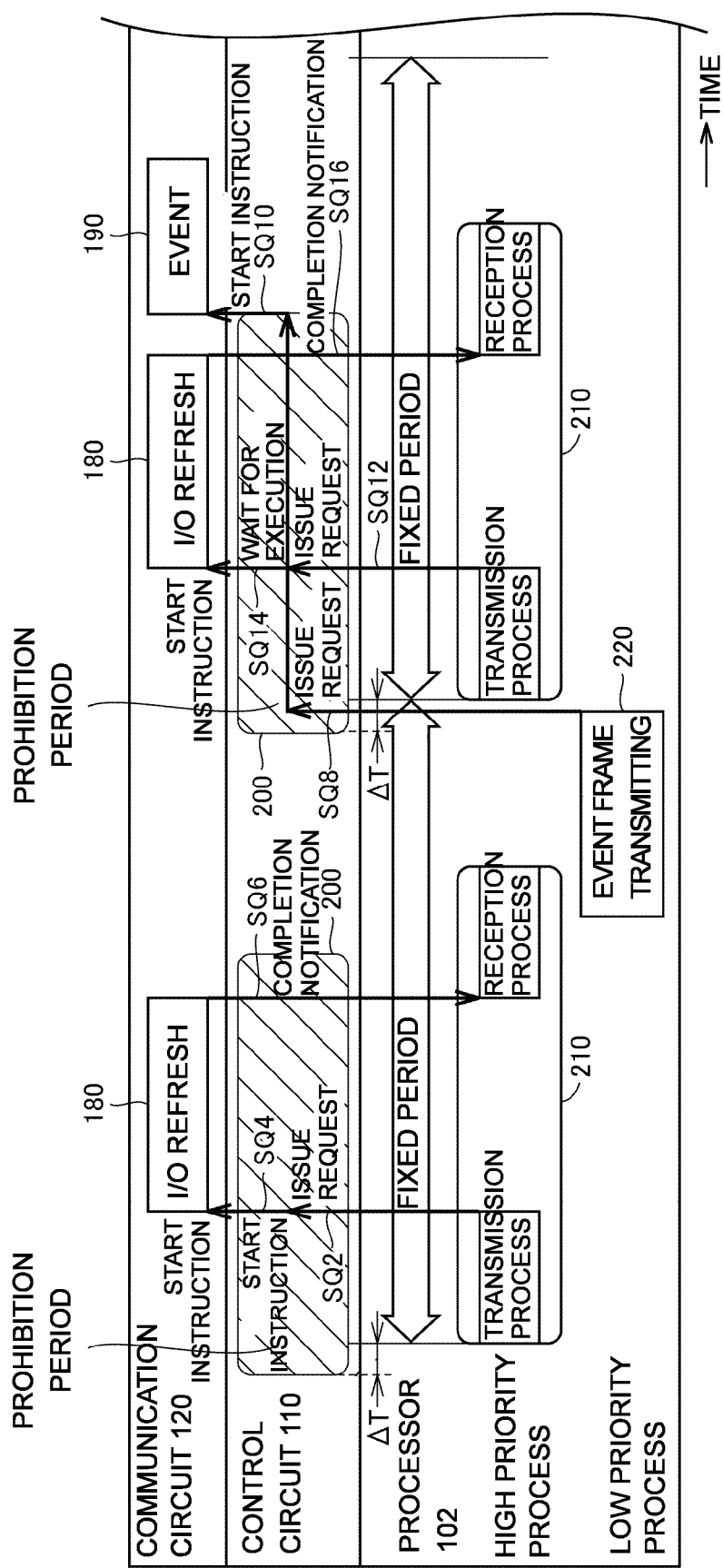
FIG. 6 is a timing diagram illustrating another process relating to the transmission of communication frames in a PLC according to this embodiment.

FIG. 6 is a timing diagram illustrating another process relating to the transmission of communication frames in the PLC 1 according to this embodiment. FIG. 6 illustrates an example of the process of a case in which a processor 102 that can execute only one of a high priority process and a low priority process (in other words, a single core or a single processor) is employed. Also in this example, the low priority process is executed between high priority processes that are executed periodically. There are cases in which the transmission process of a following high priority process is also influenced by a request for transmitting an event frame 190 (Sequence SQ8) from the low priority process executed therebetween. For this reason, by setting the prohibition period 200 including a timing (before the time ΔT) before the timing at which the execution of an I/O refreshing process 210 that is a high priority process is started, time fluctuation occurring in the process of transmitting the I/O refresh frame 180 can be decreased.

As illustrated in FIGS. 5 and 6, by managing the transmission timings of the I/O refresh frame 180 and the event frame 190 and the like by using the control circuit 110 independently from the execution of the process in the processor 102, time fluctuation occurring in the transmission timing can be decreased. In this way, even when the event frame 190 is transmitted on a same local network 126, the period of the transmission of the I/O refresh frame 180 can be stably maintained to be constant.

F. Method of Setting Prohibition Period

Figure 7A:
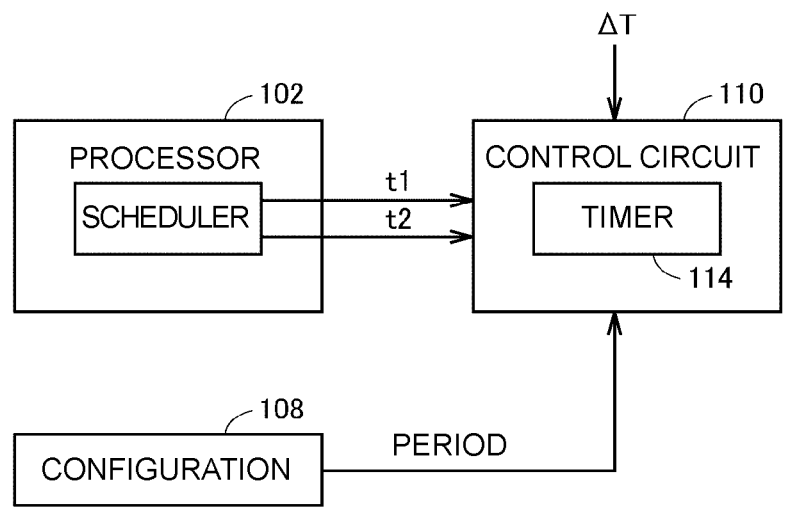
FIGS. 7A and 7B are schematic diagrams describing a method of setting a prohibition period in a PLC according to this embodiment.
Figure 7B:
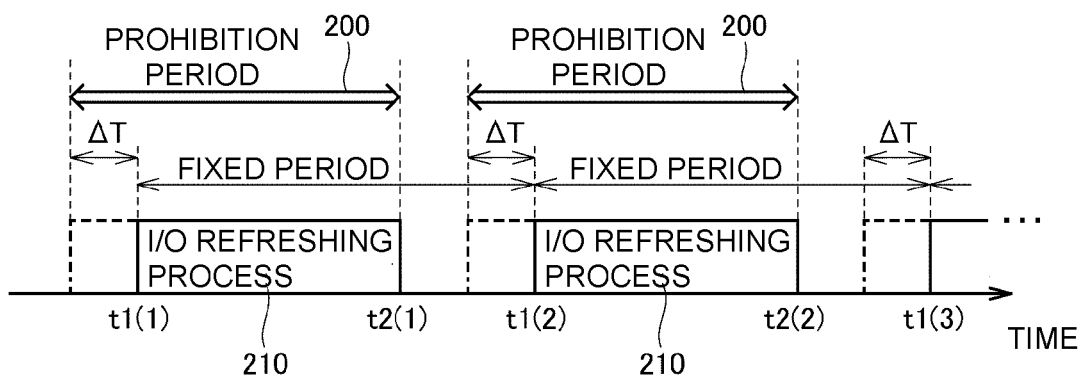

Next, an example of a method of setting the prohibition period 200 illustrated in FIG. 5 will be described. FIGS. 7A and 7B are schematic diagrams describing a method of setting the prohibition period in the PLC 1 according to this embodiment.

As illustrated in FIG. 7A, the control circuit 110 acquires an execution start timing t1 and an execution end timing t2 of the I/O refreshing process 210 from a scheduler that manages the execution timing of a program in the processor 102. In addition, the control circuit 110 acquires the length of the period in which the I/O refreshing process 210 is repeatedly executed by referring to the configuration 108 stored in the memory 104. The length of the time ΔT for starting the prohibition period 200 is set in advance by using an arbitrary method.

By acquiring or setting such parameters relating to times, as illustrated in FIG. 7B, the prohibition period 200 is set in association with the execution timing of the I/O refreshing process 210. The length of this prohibition period 200 is defined by setting the period length, the timing (phase), and the like in the timer 114 included in the control circuit 110.

In this way, by acquiring the execution timing of the I/O refreshing process 210 (first process) from the scheduler that manages the execution of the I/O refreshing process 210 (first process) and the event frame transmitting process 220 (second process) in the processor 102, the control circuit 110 may set the prohibition period 200.

The length, the start timing, the end timing, and the like of the prohibition period 200 may be calculated in advance and set in advance or may be dynamically set based on a result of execution of the I/O refreshing process 210 once or several times in the processor 102. In addition, even when those are set in advance, the parameters and the like may be appropriately changed in consideration of variations (fluctuation) in the timings and the like in accordance with a result of the execution of the I/O refreshing process 210.

When the length, the start timing, the end timing, and the like of the prohibition period 200 are set in advance, they may be calculated in advance on a support device that performs development, monitoring, and the like of a program executed by the PLC 1, or an arithmetic operation circuit including logics used for performing the setting thereof in advance may be mounted in the control circuit 110. Alternatively, the length, the start timing, the end timing, and the like of the prohibition period 200 may be calculated in advance by the system program 106 executed by the processor 102.

G. Notification of Prohibition Period

Next, the notification of the prohibition period 200 set by the control circuit 110 for a process executed in the processor 102 will be described.

As described with reference to FIG. 5, basically, the prohibition period 200 set by the control circuit 110 does not need to be notified of for the I/O refreshing process 210 and the event frame transmitting process 220 executed in the processor 102. In other words, the I/O refreshing process 210 and the event frame transmitting process 220 may issue an I/O refresh frame transmission request and an event frame transmission request in accordance with execution results of the processes. The control circuit 110 that has received such a frame transmission request processes the received frame transmission request in accordance with whether or not the received timing is within the prohibition period 200. In other words, when an event frame transmission request other than an I/O refresh frame transmission request is received within the prohibition period 200, until the end of the prohibition period 200, the giving of a start instruction that is based on the event frame transmission request to the communication circuit 120 is postponed.

In this way, in the PLC 1 according to this embodiment, the set prohibition period 200 does not need to be explicitly notified of for a process (program) executed in the processor 102, each program executed in the processor 102 does not need to be generated in consideration of the prohibition period 200, and accordingly, the mounting thereof can be easily performed.

Here, each program executed in the processor 102 may be explicitly notified of the prohibition period 200 set by the control circuit 110. In such a case, for example, a process in which a flag or the like representing whether or not the prohibition period 200 is set (in other words, whether or not it is within the prohibition period 200) is prepared in advance in a buffer area or the like that can be accessed by both the control circuit 110 and the processor 102, the control circuit 110 updates the value of the flag each time, and each program executed in the processor 102 determines whether to issue a frame transmission request based on the value of the flag may be installed. It is apparent that the configuration is not limited to a configuration using such a flag, but an arbitrary notification method may be employed.

H. First Modified Example

While a configuration in which the process of transmitting communication frames using the communication circuit 120 is controlled using a combination of the processor 102 and the control circuit 110 has been described as an example in the embodiment described above, the processor 102 and the control circuit 110 may be realized by two processors or cores.

Figure 8:
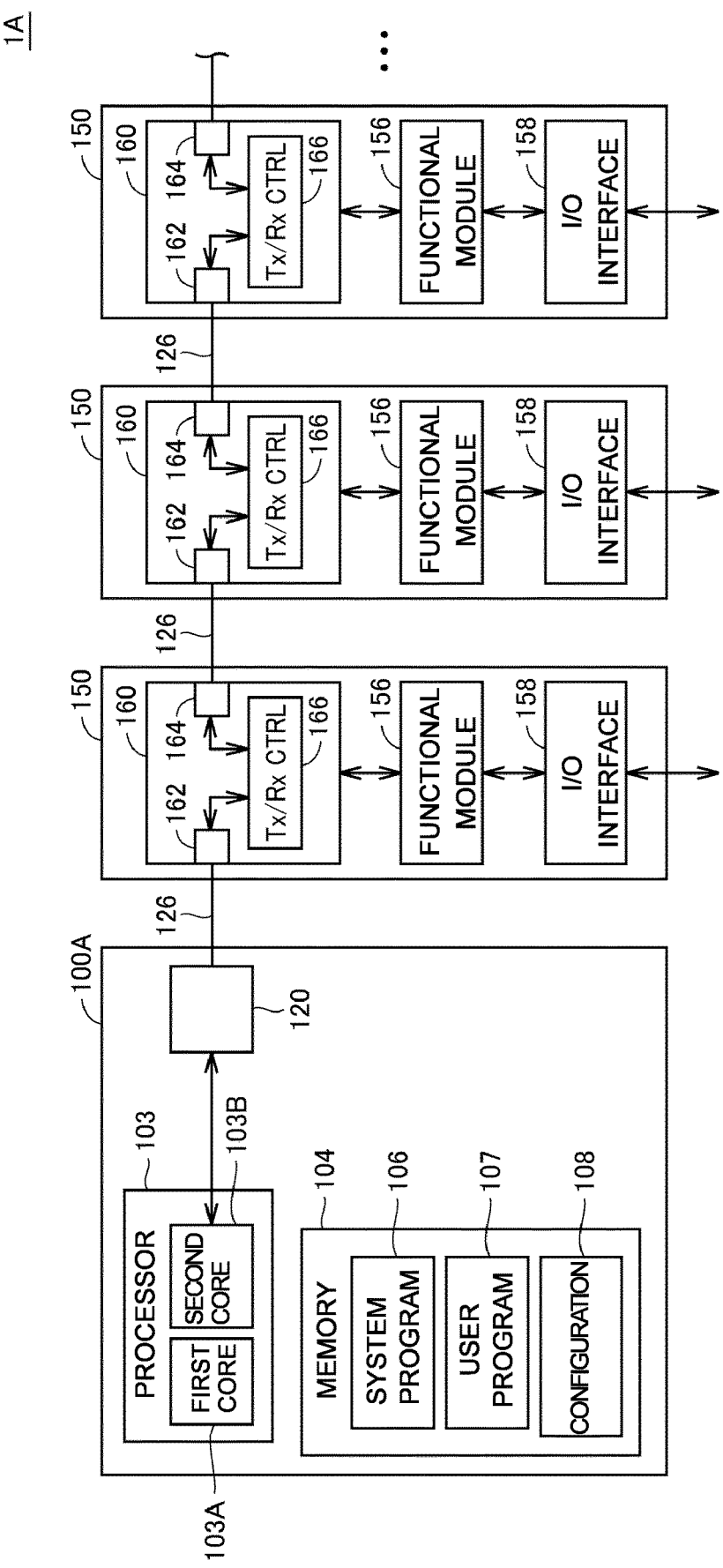
FIG. 8 is a schematic diagram illustrating the configuration of a main part of a PLC according to a first modified example of this embodiment.

FIG. 8 is a schematic diagram illustrating the configuration of a main part of a PLC 1A according to a first modified example of this embodiment. As illustrated in FIG. 8, the CPU unit 100A includes a processor 103, a memory 104, and a communication circuit 120. The CPU unit 100A includes a first core 103A and a second core 103B.

The first core 103A has a function corresponding to the processor 102 illustrated in FIG. 1, in other words, executes the I/O refreshing process 210 and the event frame transmitting process 220. On the other hand, the second core 103B has a function corresponding to the control circuit 110 illustrated in FIG. 1, in other words, executes a process of receiving frame transmission requests from the I/O refreshing process 210 and the event frame transmitting process 220 executed by the first core 103A and starting to operate the communication circuit 120. At this time, the second core 103B sets the prohibition period 200 as described above.

In this way, as the first core 103A and the second core 103B provide mutually different functions, the process of transmitting communication frames including the setting of the prohibition period 200 according to this embodiment as described above is realized.

In addition, while a configuration in which the process of setting a prohibition period according to this embodiment is realized by using the first core 103A and the second core 103B included in the single processor 103 has been illustrated as an example in FIG. 8, the configuration is not limited thereto. Thus, it may be configured such that a plurality of processors including the first and second processors are mounted, the first processor is configured to be responsible for the process of the first core 103A, and the second processor is configured to be responsible for the process of the second core 103B.

The configuration as illustrated in FIG. 8, for example, is appropriate for a case in which a communication board or the like is mounted in a general-purpose computer to realize a configuration corresponding to the CPU unit 100.

I. Second Modified Example

In the description presented above, the configuration in which communication frames (the I/O refresh frame 180 and the event frame 190) are transmitted to one or a plurality of functional units 150 connected to the CPU unit 100 through the local network 126 has been mainly described. In addition, a similar scheme may be applied to one or a plurality of functional units 150 connected through a field network.

Figure 9:
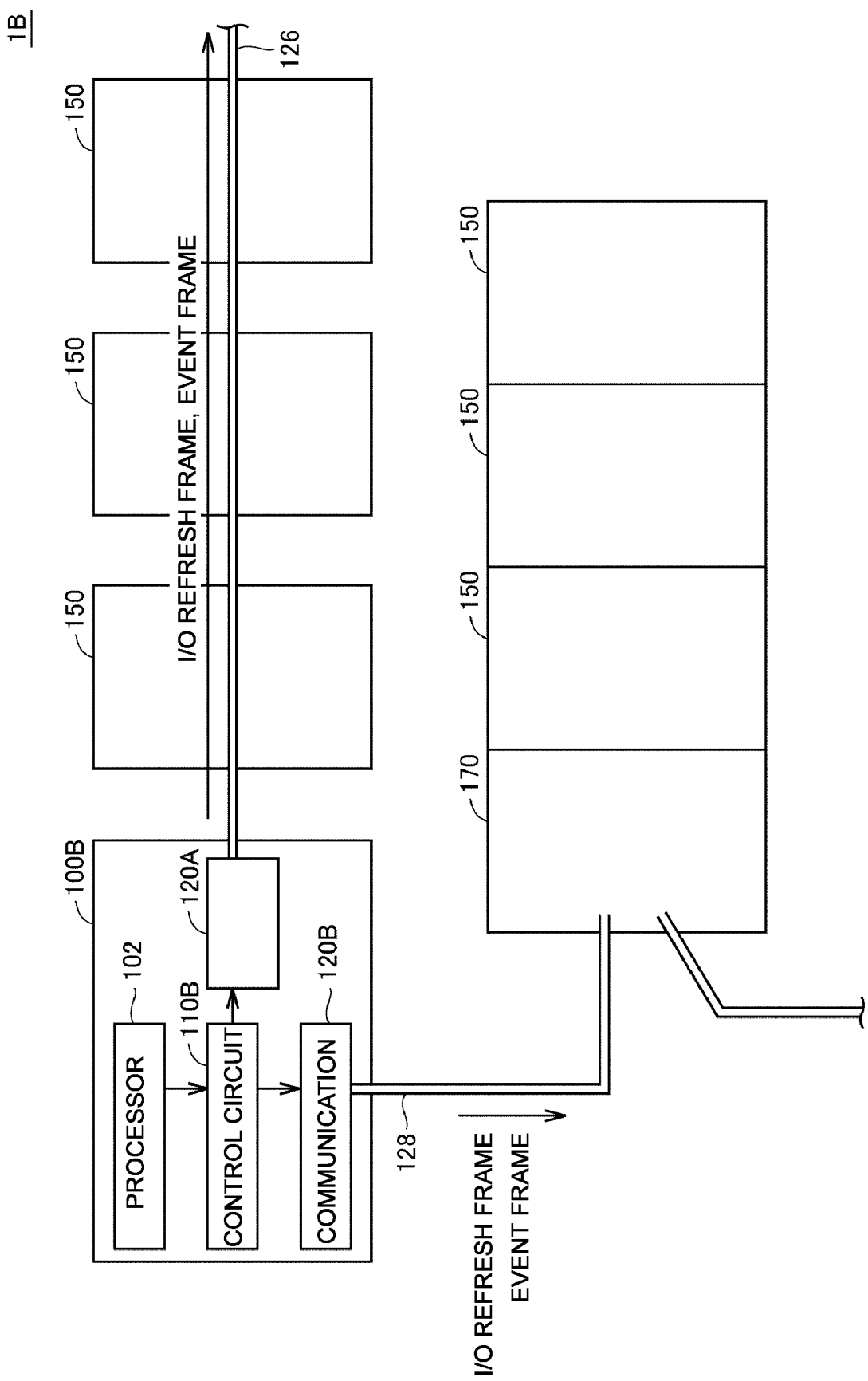
FIG. 9 is a schematic diagram illustrating the configuration of a main part of a PLC according to a second modified example of this embodiment.

FIG. 9 is a schematic diagram illustrating the configuration of a main part of a PLC 1B according to a second modified example of this embodiment. As illustrated in FIG. 9, a CPU unit 100B of the PLC 1B includes a communication circuit 120A controlling a local network 126 connected to one or a plurality of functional units 150 and a communication circuit 120B controlling a field network 128 connected to a remote I/O device (a communication coupler unit 170 and one or a plurality of functional units 150). A control circuit 110B gives a start instruction to the communication circuit 120A and the communication circuit 120B.

Also in such a configuration, a processor 102 of the CPU unit 100B issues an I/O refresh frame transmission request and an event frame transmission request by executing the I/O refreshing process 210 and the event frame transmitting process 220. The control circuit 110B sets the prohibition period described above for each of the local network 126 and the field network 128, and when a certain frame transmission request is received, processes the received frame transmission request in accordance with whether it is within the prohibition period. The basic process is similar to that of the embodiment described above, and detailed description thereof will not be repeated.

In this way, the process of setting the prohibition period according to this embodiment can be applied not only to the process of transmitting communication frames to the functional units 150 connected to the CPU unit 100 through the local network 126 but also to the process of transmitting communication frames to the functional units 150 connected through the field network 128.

While the CPU unit 100 including both the local network 126 and the field network 128 is illustrated as an example in FIG. 9 for the convenience of description, a CPU unit 100 including only the field network 128 may be similarly applied.

J. Advantage

In the PLC 1 according to this embodiment, a prohibition period in which the transmission of a communication frame other than the I/O refresh frame is prohibited is set in correspondence with the transmission period of the I/O refresh frame (in other words, the execution period of the I/O refreshing process). Such a prohibition period is set by the control circuit 110 that is independent from the processor 102. Accordingly, the transmission period of an I/O refresh frame can be guaranteed without being influenced by a time fluctuation occurring in the execution of a program in the processor 102.

The embodiments described here should be considered not to be limited but to be exemplary in every aspect. The scope of the present invention is represented not by the description presented above but by the claims and is intended to include all the changes in the meaning and range of equivalency to the claims.

What is claimed is:

1. An arithmetic operation device configuring a control apparatus, the arithmetic operation device comprising:
 a communication circuit that is used for exchanging data with one or a plurality of functional units through a communication line;
 a processor that executes a first process used for issuing a first request for transmitting or receiving data through the communication line in every period set in advance and a second process used for issuing a second request for transmitting data through the communication line when a condition set in advance is satisfied; and
 a control circuit, coupled between the processor and the communication circuit, that starts to operate the communication circuit in response to the first request and the second request issued by the processor,
 wherein the control circuit includes a unit that sets a prohibition period according to a transmission period of the first request and an execution period of the first process, and the control circuit sets the prohibition period by adding a predetermined time period before an execution starting time of the first process, wherein, the second request is invalidated during the prohibition period.

2. The arithmetic operation device according to claim 1, wherein, when the second request is received within the prohibition period, the control circuit postpones start of an operation of the communication circuit in response to the received second request until after an end of the prohibition period.

3. The arithmetic operation device according to claim 2, wherein the second request is executed by the processor prior to the first request, and the operation of the communication circuit for executing the second process is postponed until a completion of the execution of the first process by the communication circuit.

4. The arithmetic operation device according to claim 1, wherein the control circuit starts the prohibition period a time set in advance before an execution timing of the first process.

5. The arithmetic operation device according to claim 1, wherein the control circuit acquires an execution timing of the first process comprising an execution start timing and an execution stop timing from a scheduler managing execution of the first process and the second process in the processor and sets the prohibition period.

6. The arithmetic operation device according to claim 1, wherein the first request includes at least one of a request for transmitting data to the one or plurality of functional units and a request for acquiring data stored by the one or plurality of functional units.

7. The arithmetic operation device according to claim 1, wherein the first request includes a request for transmitting a message to a specific functional unit among the one or plurality of functional units.

8. The arithmetic operation device according to claim 1, wherein the control circuit is mounted using an FPGA or an ASIC.

9. The arithmetic operation device according to claim 1, wherein the communication circuit exchanges data of the first process during the transmission period of the first request.

10. A control apparatus comprising:
 an arithmetic operation device; and
 one or a plurality of functional units,
 wherein the arithmetic operation device includes:
  a communication circuit that is used for exchanging data with the one or plurality of functional units through a communication line;
  a processor that executes a first process used for issuing a first request for transmitting or receiving data through the communication line in every period set in advance and a second process used for issuing a second request for transmitting data through the communication line when a condition set in advance is satisfied; and
  a control circuit, coupled between the processor and the communication circuit, that starts to operate the communication circuit in response to the first request and the second request issued by the processor, and
 wherein the control circuit includes a unit that sets a prohibition period according to a transmission time of the first request and an execution period of the first process, and the control circuit sets the prohibition period by adding a predetermined time period before an execution starting time of the first process, wherein, the second request is invalidated during the prohibition period.

* * * * *